US009870124B2

(12) United States Patent
Nalliah et al.

(10) Patent No.: US 9,870,124 B2
(45) Date of Patent: *Jan. 16, 2018

(54) COMMUNICATIONS GROUPED AS CONVERSATIONS

(71) Applicant: Microsoft Corporation, Redmond, WA (US)

(72) Inventors: Selvaraj Nalliah, Redmond, WA (US); Shivakumar Seetharaman, Snoqualmie, WA (US); Salman Zafar, Mill Creek, WA (US); John Allen Atwood, Duvall, WA (US); David P. Limont, Seattle, WA (US); Joseph T. Flint, Sammamish, WA (US); Alexandru Leconiuc, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 323 days.

This patent is subject to a terminal disclaimer.

(21) Appl. No.: 14/226,491

(22) Filed: Mar. 26, 2014

(65) Prior Publication Data
US 2014/0208229 A1 Jul. 24, 2014

Related U.S. Application Data

(63) Continuation of application No. 12/242,676, filed on Sep. 30, 2008, now Pat. No. 8,725,813.

(51) Int. Cl.
*G06F 15/16* (2006.01)
*G06F 3/0482* (2013.01)
(Continued)

(52) U.S. Cl.
CPC ............ *G06F 3/0482* (2013.01); *H04L 51/38* (2013.01); *H04L 12/1827* (2013.01)

(58) Field of Classification Search
USPC .................................. 709/204, 206; 719/313
See application file for complete search history.

(56) References Cited

U.S. PATENT DOCUMENTS 5,826,022 A   10/1998 Nielsen
6,212,553 B1   4/2001 Lee et al.
(Continued)

OTHER PUBLICATIONS

Bramson, Steven et al., "Microsoft Exchange Server 2003 ActiveSync Architecture", located online at: http://download.microsoft.com/download/8/b/c/8bc34a2d-ce61-431d-964f-73115641e413/mobdvc.doc, White Paper, Jul. 2008, 12 pgs.
(Continued)

*Primary Examiner* — Liangchea Wang

(57) ABSTRACT

Described are embodiments for displaying groups of communications, such as messages, as a conversation. Conversations are groups of communications that can be traced back as related to an original communication. The embodiments allow a user to select a conversation mode for displaying communications, e.g., messages, as conversations. In response to the user's selection, embodiments provide for displaying a graphical element associated with a conversation. The graphical element can be selected to display the messages associated with the conversation. Additionally, embodiments provide for selecting a conversation and applying actions to the conversation, resulting in the application of the action to the messages that are associated with the conversation.

18 Claims, 8 Drawing Sheets

(51) Int. Cl.
*H04L 12/58* (2006.01)
*H04L 12/18* (2006.01)

(56) References Cited

U.S. PATENT DOCUMENTS

| | | | |
|---|---|---|---|
| 6,694,336 | B1 | 2/2004 | Multer et al. |
| 7,000,032 | B2 | 2/2006 | Kloba et al. |
| 7,032,033 | B1 | 4/2006 | LeDoux et al. |
| 7,239,877 | B2 | 7/2007 | Corneille et al. |
| 7,251,495 | B2 | 7/2007 | Keyani et al. |
| 7,359,991 | B2 | 4/2008 | Balducci et al. |
| 7,406,501 | B2 | 7/2008 | Szeto et al. |
| 8,725,813 | B2 | 5/2014 | Nalliah et al. |
| 2002/0032722 | A1 | 3/2002 | Baynes, Jr. et al. |
| 2004/0078441 | A1* | 4/2004 | Malik .............. G06Q 10/107 709/206 |
| 2005/0055416 | A1* | 3/2005 | Heikes ............. G06Q 10/107 709/207 |
| 2006/0010200 | A1* | 1/2006 | Mousseau ......... H04L 12/1813 709/204 |
| 2006/0271563 | A1* | 11/2006 | Angelo .............. G06Q 10/06 |
| 2007/0100843 | A1* | 5/2007 | Chen ................. G06Q 10/107 |
| 2008/0222538 | A1* | 9/2008 | Cardu .............. G06F 17/30873 715/760 |
| 2009/0119678 | A1* | 5/2009 | Shih ................. G06Q 10/10 719/313 |

OTHER PUBLICATIONS

Larkin, Henry, "Data Representations for Mobile Devices", located online at: http://ieeexplore.ieee.org/iel5/4447704/4447705/04447744.pdf?isnumber=4447705&arnumber=4447744, Abstract, IEEE, 2007, 6 pgs.

Goldberg, Yaron et al., "Active Mail—A Framework for Implementing Groupware", located online at: http://pbfb5www.uni-paderborn.de/www/WI/WI2/wi2_lit.nsf/663247270b635985c1256bc900519bef/019d29ff51776296412565090056 2e8c/$F1LE/p75-goldberg.pdf, Abstract, CSCW Proceedings, Nov. 1992, pp. 75-83.

Larkin, Henry, "Applying Concurrent Versioning to Serverless Mobile Device Synchronisation", Located online at: http://ieeexplore.ieee.org/iel5/4276338/4276339/04276374.pdf?tp=&isnumber=&arnumber=4276374, Abstract, IEEE/ACIS Int'l. Conference on Computer and Information Science (ICIS 2007), 6 pgs.

U.S. Appl. No. 12/242,676, Non-final Rejection dated May 20, 2010, 14 pages.
U.S. Appl. No. 12/242,676, Amendment and Response dated Oct. 20, 2010, 11 pages.
U.S. Appl. No. 12/242,676, Final Rejection dated Oct. 27, 2010, 16 pages.
U.S. Appl. No. 12/242,676, Amendment and Response dated Mar. 1, 2011, 10 pages.
U.S. Appl. No. 12/242,676, Non-final Rejection dated Mar. 24, 2011, 15 pages.
U.S. Appl. No. 12/242,676, Amendment and Response dated Jun. 24, 2011, 11 pages.
U.S. Appl. No. 12/242,676, Final Rejection dated Jul. 12, 2011, 24 pages.
U.S. Appl. No. 12/242,676, Amendment and Response dated Nov. 14, 2011, 12 pages.
U.S. Appl. No. 12/242,676, Non-final Rejection dated May 15, 2013, 18 pages.
U.S. Appl. No. 12/242,676, Amendment and Response dated Aug. 15, 2013, 8 pages.
U.S. Appl. No. 12/242,676, Final Rejection dated Sep. 13, 2013, 27 pages.
U.S. Appl. No. 12/242,676, Amendment and Response dated Dec. 13, 2013, 9 pages.
U.S. Appl. No. 12/242,676, Notice of Allowance dated Dec. 26, 2013, 18 pages.
"Configuring Outlook 2003 for Offline Use with Exchange 2003", Overview, located online at: http://whitepapers.techrepublic.com.com/abstract.aspx?&docid=264631&promo=100511, Jul. 2004, 2 pgs.
Trapani, Gina, "New Gmail Feature: "Mute" endless threads", located online at: https://lifehacker.com/214246/214246/214246/new-gmail-feature--mute-endless-threads, lifehacker.com, Nov. 13, 2006, 2 pages.
Devindra Hardawar, "Six years late, Google now lets you turn off Gmail's conversation threads", located online at: https://venturebeat.com/2010/09/29/six-years-late-google-now-lets-you-turn-off-gmails-conversation-threads/,venturebeat.com, Sep. 29, 2010, 2 pages.
"Unsubscribe from Thread: Automatically Remove Unwanted Conversations from the Inbox", Retrieved From <<http://www.clearcontext.com/user_guide/unsubscribe.html>, Mar. 28, 2007, 2 Pages.
Barr, Jim, "Welcome to "Gmail Tips: the Complete Collection, Retrieved From <<https://web.archive.org/web/20041016085404/http://www.g04.com/mis/GmailTipsComplete.html>>, Oct. 16, 2004, 26 Pages.

* cited by examiner

COMMUNICATIONS GROUPED AS CONVERSATIONS

This application is a continuation application of U.S. Pat. No. 8,725,813, filed Sep. 30, 2008, entitled "COMMUNICATIONS GROUPED AS CONVERSATIONS", which is hereby incorporated by reference in its entirety.

BACKGROUND

Mobile devices e.g., telephones and PDA's, are commonly used to send and receive communications, such as electronic mail, text messages, voice messages, and telephone calls. Mobile devices provide the advantage of convenience and allow users to access communications from any location where there is a signal. However, the small screen sizes and storage capacity of mobile devices make it difficult for users to view, sort, organize, and manipulate communications from a mobile device. Current applications do not provide convenient ways for users to view communications compactly and perform actions on groups of communications efficiently.

It is with respect to these and other considerations that embodiments of the present invention have been made. Also, although relatively specific problems have been discussed, it should be understood that embodiments of the present invention should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Described are embodiments for displaying groups of communications, such as messages, as a conversation. Conversations are groups of communications that can be traced back as related to an original communication. The embodiments allow a user to select a conversation mode for displaying communications as conversations. In response to the user's selection, embodiments provide for displaying graphical elements associated with a conversation. When a conversation element is selected, graphical elements associated with the communications that make up the conversation are displayed. A user can then select a communication element to view the contents of the communication. Embodiments also allow users to act on groups of communications by acting on a conversation.

Embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures.

DETAILED DESCRIPTION

Various embodiments are described more fully below with reference to the accompanying drawings, which form a part hereof, and which show specific embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects.

The description below describes embodiments where the communications are messages, such as e-mail messages, SMS messages (i.e., text messages), or voice messages. However, it should be understood that the communications are not limited to such messages. The use of messages in the description below is merely for illustrative purposes. In other embodiments, the communications may include missed call communications, dialed call communications, instant messaging communications, etc. The following detailed description is, therefore, not to be taken in a limiting sense.

Figure 1:
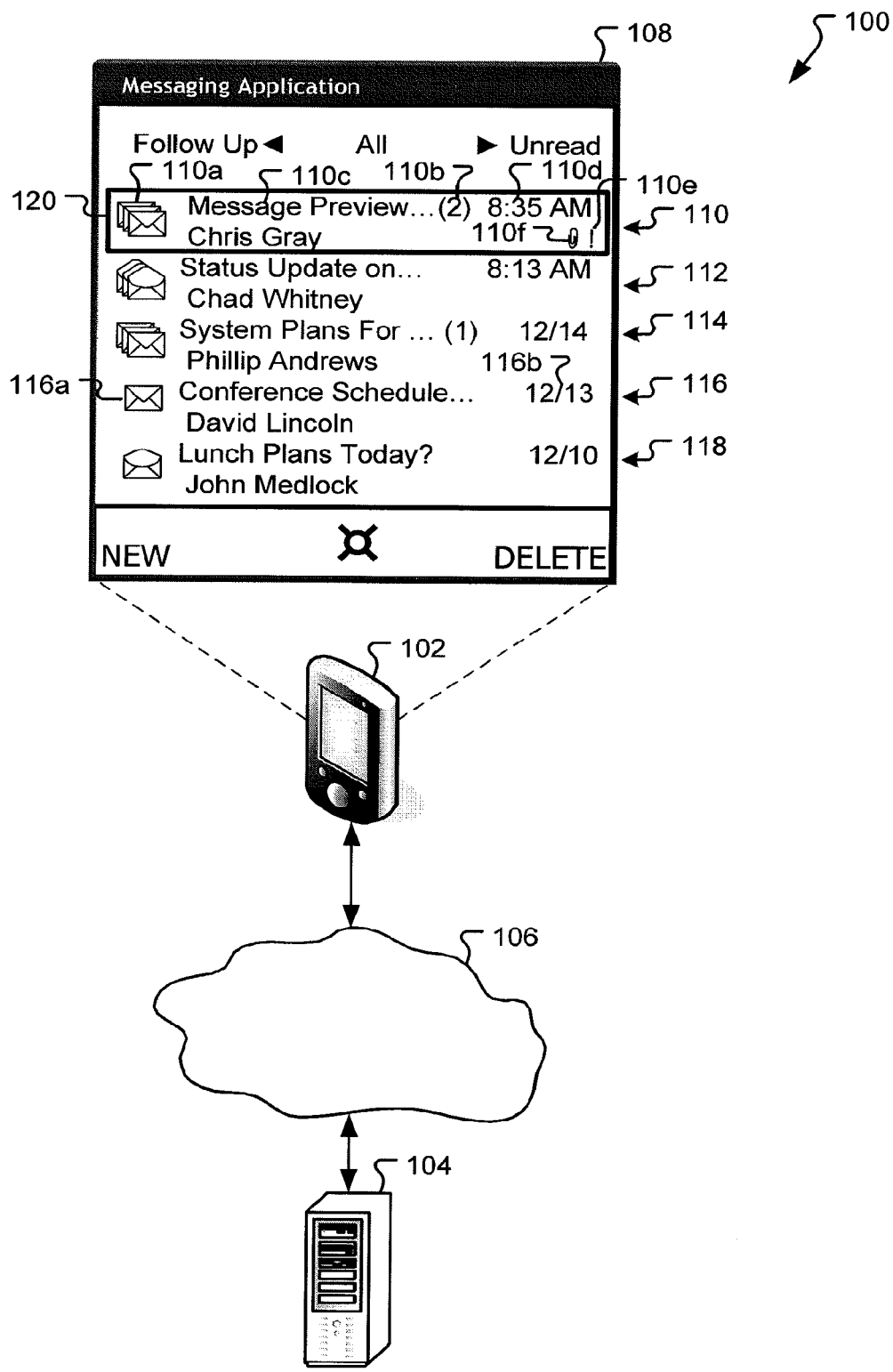
FIG. 1 illustrates an embodiment with a mobile device providing a user interface for displaying conversations.

FIG. 1 illustrates a distributed system 100, with a client computer 102 and a server computer 104 that are connected through a network 106. Client 102 is shown in FIG. 1 as a mobile device, e.g. a cellular phone or personal digital assistant (PDA). In the embodiment shown in FIG. 1 client 102 accesses communications, such as messages stored, at least in part, in a message account (e.g., an electronic mail account) on server 104. Client 102 includes a messaging application that allows a user to request, view, and organize messages stored locally on client 102 and downloaded from server 104. The messages may be stored in any structure within client 102 and server 104, such as in one or more folders, directories or subdirectories. The messaging application is described herein as an electronic mail (e-mail) application. However, it should be understood that in other embodiments the messaging application may relate to other types of communications such as text messages, voice messages, etc.

In embodiments, client 102 and server 104 will periodically synchronize information with server 104. For example, the synchronization may involve communications, e.g., e-mail messages, text messages, voice mail message; contact information, e.g., phone numbers, addresses; calendar information, e.g., tasks, appointments etc. In one embodiment, a client 102 sends a request to the server to synchronize information. The request includes a filter to limit the items to be synchronized. The filter may limit the synchronization to certain types of information, such as messages, contacts, calendar information, or may limit the synchronization in other ways, e.g., messages received within a predetermined period of time. In another embodiment, the filter may be based on messages related to certain conversations (described in greater detail below).

As shown in FIG. 1, the messaging application on client 102 provides a user interface that allows a user to conveniently view a number of messages that relate to the same conversation. As those with skill in the art will appreciate, communications, including messages, are often part of a chain or string of communications. For example, e-mails are often part of a chain with a number of send and reply messages that can all be traced back to an original send message. A group of communications which can be traced back to an original communication are referred to herein as a conversation. The messaging application of client 102 allows a user to view and organize groups of communications, namely messages, as a single conversation. The ability to view and organize communications as a single conversation provides a user with a rich communication experience as described in greater detail below.

FIG. 1 illustrates a user interface 108 that includes a number of graphical elements 110, 112, 114, 116, and 118, each of which are associated with a different conversation. User interface 108 is displayed on a display of client 102. Conversation element 110 is selected as indicated by box 120. It should be understood that box 120 is only one way in which selection of a graphical element can be shown. In other embodiments, conversation element 110 may be highlighted, bolded, faded, shown in a different font, shown as blinking, animated, or otherwise distinguished from the other graphical elements.

Conversation element 110 includes an icon 110a of closed envelopes. Icon 110a indicates to a user that at least one of the messages in the conversation associated with graphical element 110 has not been read. Additionally, element 110 also includes an indication 110b of how many communications, in this case messages, in the conversation have not been accessed, e.g., read. As shown in FIG. 1, there are two unread messages in the conversation. Element 110 also includes some text 110c, which as shown in FIG. 1 includes a subject header and an author header. The text 110c can include in some embodiments the author of the original message that started the conversation. In other embodiments, text 110c may include the name of the author of the latest message in the conversation In yet other embodiments text 110c may include both, with one of the names being displayed in such a way to distinguish from the other, e.g., highlight, parenthesis, etc. A date/time indicator 110d is also part of element 110, which indicates the date of the most recent message in the conversation.

An additional feature of element 110 is shown in icons 110e and 110f. Icons 110e and 110f roll-up information of messages within the conversation. That is, icons 110e and 110f indicate that at least one message in the conversation has a particular status or includes particular information. As shown in FIG. 1, icon 110e indicates that at least one message in the conversation has a status of, high importance. Also, icon 110f indicates that at least one message has an attachment. As these icons illustrate, element 110 will include, in embodiments, any indicators that are associated with at least one message in the conversation.

Also shown in FIG. 1, is icon 116a showing a single closed envelope. Icon 116a indicates to a user that the graphical element 116 is associated with a conversation that includes only a single message that is unread. Because the latest, and this case the only message, in the conversation was sent or received at least a day before, the date/time indicator 116b indicates only a date. In other embodiments, the date/time indicator of a conversation may include both a date, a time, or a combination of the two.

As FIG. 1 illustrates interface 108 provides a large amount of information to a user of client 102 about messages in a conversation. With one glance, a user is able to quickly determine, in embodiments, the time of the latest message in a conversation, the author, whether/how many messages are unread, and rollup information for the messages. Elements 110, 112, 114, 116, and 118 provide this type of information for five conversations. As those with skill in the art will appreciate, interface 108, while requiring a minimal amount of display area, allows a large amount of information to be quickly conveyed to a user about a large number of messages (as conversations), which provides a significant advantage over other applications that merely provide a list of messages in chronological order.

Figure 2:
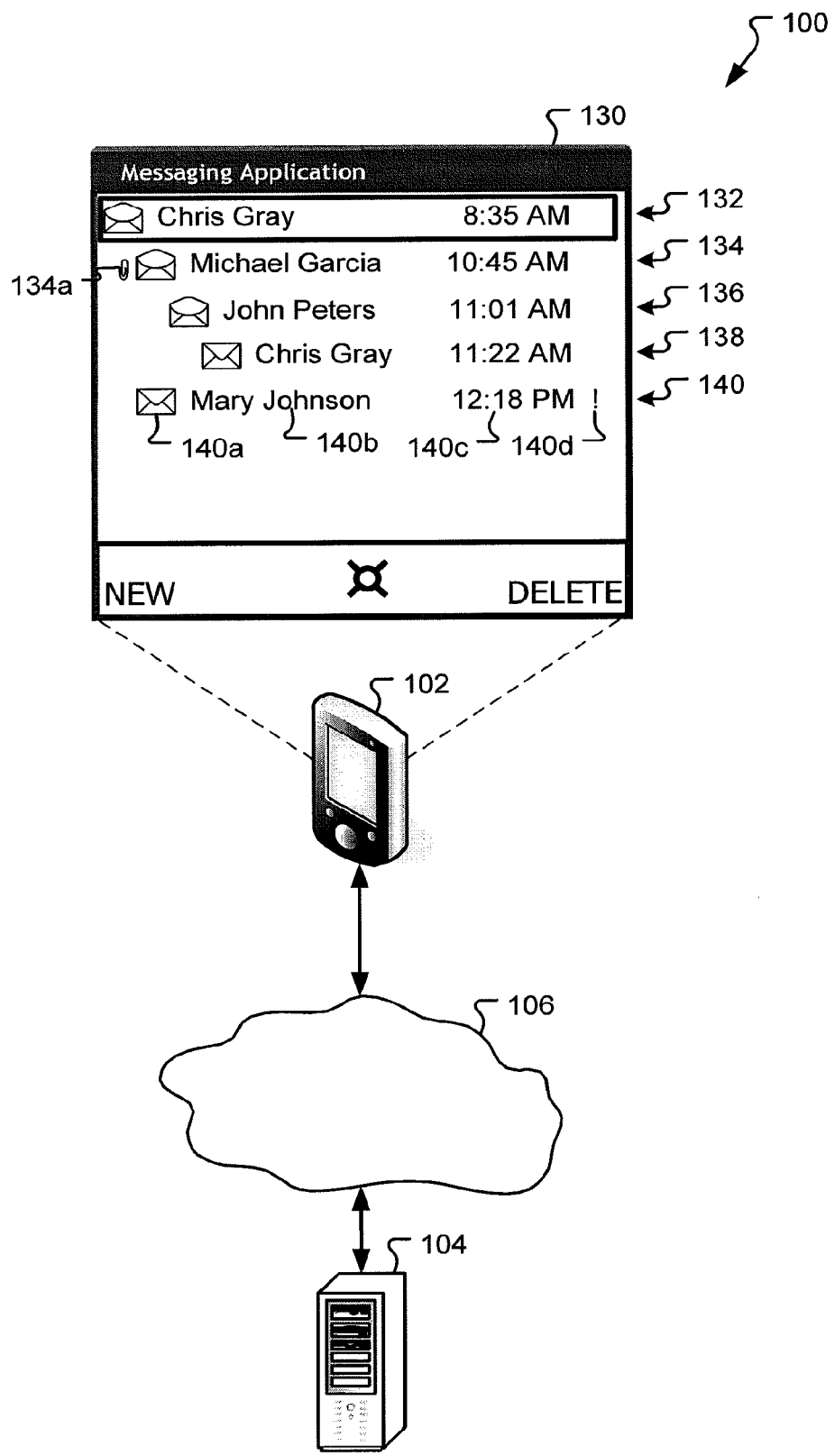
FIG. 2 illustrates the embodiment of FIG. 1 with the mobile device providing a second user interface for displaying messages associated with a selected conversation.

FIG. 2 illustrates system 100 and user interface 130. User interface 130 shows an embodiment of an interface that is displayed on client 102 after one of elements 110, 112, 114, 116, and 118 (FIG. 1) has been selected, in this case element 110 has been selected. Interface 130 includes a number of graphical elements 132, 134, 136, 138, and 140 each of which is associated with a message of the conversation that has been selected. As shown in FIG. 1, each of the message elements may include icons that provide information to the user. Graphical element 140 includes an icon of a closed envelope 140 indicating that the message associated with element 140 has not been read. Also, element 140 includes text 140b indicating the author of the message. A time indicator 140c indicates the time that the message was received. Finally, status indicator 140d indicates that the message is of high importance. Also shown in interface 130 as part of graphical element 134 is an icon of a paper clip 134a indicating that one of the messages includes an attachment.

One feature illustrated in interface 130 is the display of messages in a tree hierarchy. As can be seen in FIG. 2, the elements 132, 134, 136, 138, and 140 are arranged in a tree hierarchy, with different indentations from the left to convey information regarding whether a message is a reply to a previous message. As illustrated in interface 130, element 134 is located under element 132 and is slightly indented from the left to show that it is a reply to the message of element 132. Also, element 136 is located under element 134 and is indented further from the left to show that it is a reply to the message of element 134. Element 138 is displayed under element 136 and even further indented from the left to indicate that it is a reply to the message of 136. Finally, element 140 is located underneath element 132 and is indented the same amount as element 134 to indicate that it is a reply to message 132.

As is shown by interface 130, the tree hierarchy quickly provides information about the relationship among messages of a conversation. When displaying messages on a mobile client with limited display area, the ability to convey information quickly with limited display area is important. In other embodiments, interface 130 may also provide additional ways of conveying the relationships among messages. For example, messages may be formatted such that related messages are formatted the same, e.g., in bold, in a color, or in a style. As another alternative, messages in some embodiments are grouped by author, date/time, or status (e.g., importance), instead of a send/reply relationship.

In other embodiments, messages of a conversation are not displayed on interface 130 using a hierarchy. Instead, the messages are displayed as a simple flat list of messages sorted in a chronological order. A flat list provides the advantage of simplicity and requires less development time for interface 130.

Figure 3:
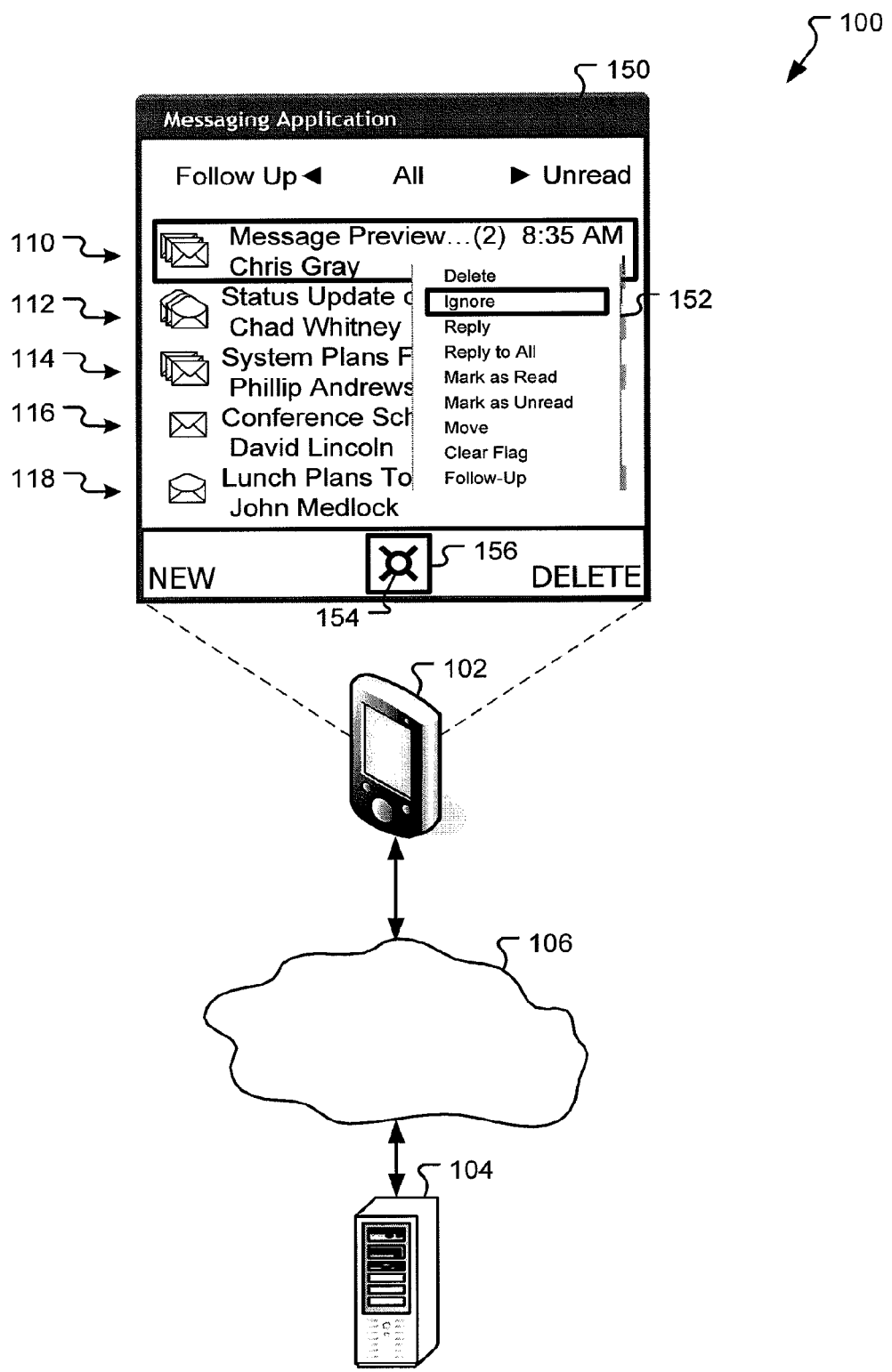
FIG. 3 illustrates the embodiment of FIG. 1 with the mobile device providing a third user interface for applying actions to conversations.

FIG. 3 shows an interface 150 which is similar to interface 108. Interface 150 includes conversation elements 110, 112, 114, 116, and 118. Interface 150 also shows a menu 152 that is displayed in response to a selection of a menu button 154. In FIG. 3, menu button 154 is a graphical element that is selected as indicated by box 156. In other embodiments, menu button 154 may be an actual button, e.g. of a keyboard, on client 102.

As illustrated in FIG. 3, selection of menu button 154 causes menu 152 to be displayed. Menu 152 includes a list of actions that may be applied to a selected conversation. Menu 152 includes some examples of actions that may be applied to a conversation. The embodiment shown in FIG. 3 includes the actions: delete, ignore, reply, reply to all, mark as read, mark as unread, move, clear flag, and follow-up. It should be understood that menu 152 is not limited to the actions shown in FIG. 3. In other embodiments, menu 152 may include different and/or additional actions than those listed in menu 152. Once a user selects an action, the action is applied to the conversation, i.e. messages associated with the conversation.

Some actions listed on menu 152 are applied to an entire conversation, i.e., every message of the conversation. This allows a user the ability to efficiently act on a number of messages at once. As shown in FIG. 3, a user has selected the conversation associated with element 110 and selected the menu button 154, which results in the display of menu 152. In the embodiment shown in FIG. 3, if a user selects "delete," all of the messages in the conversation of element 110 will be deleted from client 102. Similarly, in embodiments, when a user selects "mark as read," "mark as unread," "move," "clear flag," "follow-up," the action is applied to all messages associated with a conversation.

The "ignore" action listed in menu 152 allows a user to control whether messages of conversation 110 are sent to client 102. If a user selects the ignore action, the messages associated with conversation 110 will not be downloaded or displayed on client 102. Also, the user will not be notified of any new messages associated with conversation 110. In other words, messages received at the message account on the server 104 will not be forwarded to client 102. In some embodiments, if a user later decides to change the ignore status, a separate list of ignored conversations are displayed and a user may select a conversation to change from the ignored status.

In other embodiments, the actions listed on menu 152 are applied to a single, or a portion of the messages, in a conversation. As one example, the "reply" action, in embodiments, is applied only to the last message in the conversation. When a user selects the "reply" action an empty message template is created with a pre-populated address header using the address from the To or From header of the last message in the conversation, depending on whether the last message was sent or received. Similarly, "reply to all," in embodiments, causes an empty message template to be created with all of the addresses from the To or From header of the last message in the conversation.

In other embodiments, the actions listed on menu 152 are applied to a subset of the messages in a conversation. For example, actions may be applied to the previous two or three messages in the conversation. As another example, actions may be applied to messages that have been received within a certain period of time, such as the last 4 hours, the last day, or the last week. As one example, selection of the "reply" or "reply to all" action results in generating an empty message template with a pre-populated address header using the addresses from the To or From headers of messages from the last 4 hours, the last day, or the last week.

It should be understood that the foregoing description was for illustrative purposes only. All of the actions show in menu 152 are capable of being applied to all messages in a conversation, a portion of messages in a conversation, or a single message of a conversation. The description above of certain actions applying to only one conversation or to all messages of a conversation should not be interpreted as limiting.

As illustrated by FIG. 3 and the foregoing description, embodiments allow a user to act on a large number of messages grouped together as conversations. This allows the user to efficiently delete, move, or otherwise act on a large number of messages without having to find, select and act on each individual message. These embodiments are particularly beneficial on a mobile client device.

FIGS. 4-7 illustrate operational flows 400, 500, 600, and 700 according to embodiments. Operational flows 400, 500, 600, and 700 may be performed in any suitable computing environment. For example, the operational flows may be executed by systems such as illustrated in FIGS. 1-3. Therefore, the description of operational flows 400, 500, 600, and 700, may refer to at least one of the components of FIGS. 1-3. However, any such reference to components of FIGS. 1-3 is for descriptive purposes only, and it is to be understood that the implementations of FIGS. 1-3 are non-limiting environments for operational flows 400, 500, 600, and 700.

Furthermore, although operational flows 400, 500, 600, and 700 are illustrated and described sequentially in a particular order, in other embodiments, the operations may be performed in different orders, multiple times, and/or in parallel. Further, one or more operations may be omitted or combined in some embodiments.

The description of FIGS. 4-7 describes embodiments where the communications are messages, such as e-mail messages, SMS messages (i.e., text messages), or voice messages. However, it should be understood that the communications are not limited to such messages. In other embodiments, the communications may include missed call communications, dialed call communications, instant messaging communications, etc. The following detailed description is, therefore, not to be taken in a limiting sense.

Figure 4:
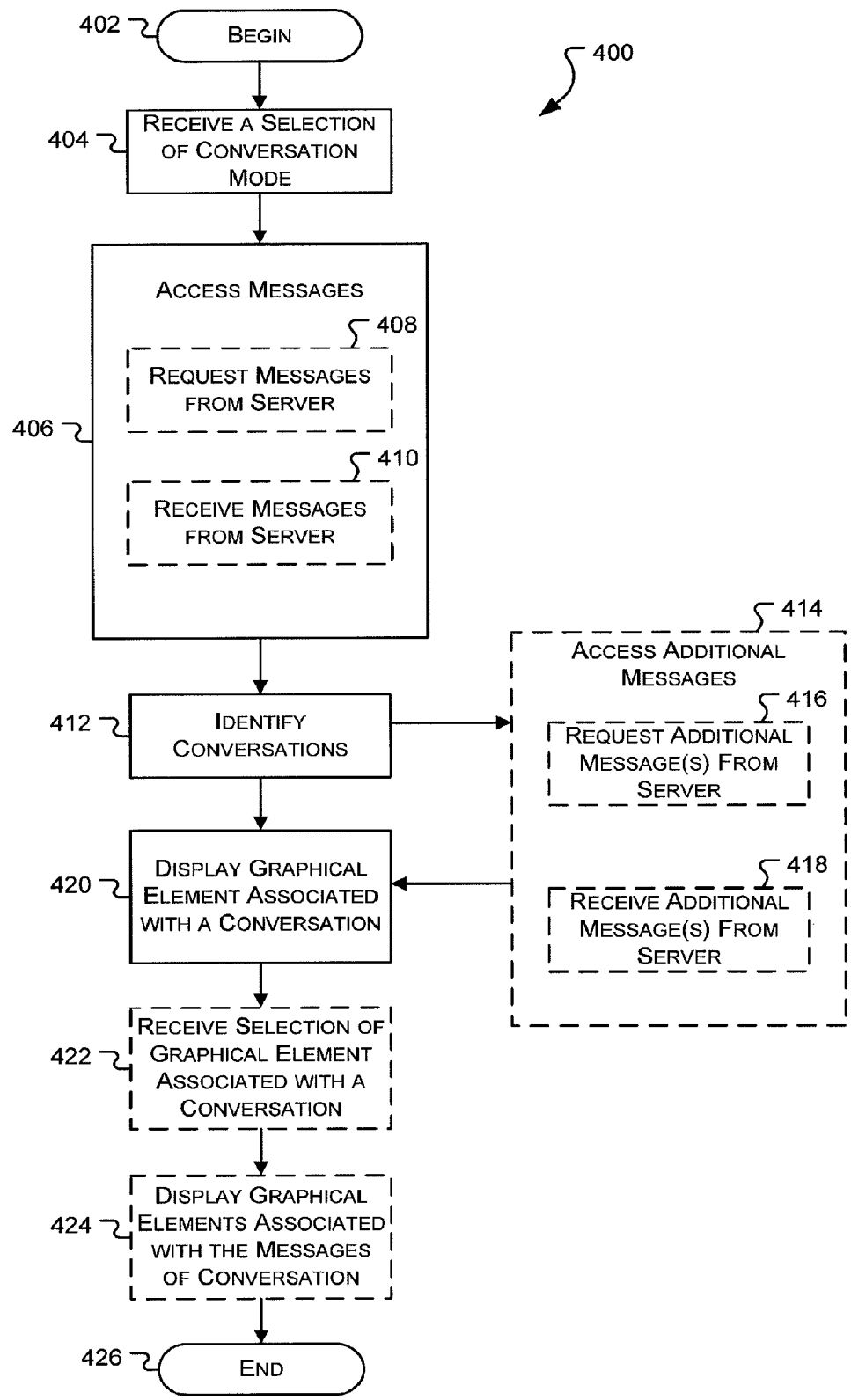
FIG. 4 illustrates an operational flow for displaying messages consistent with an embodiment.

FIG. 4 illustrates an operational flow 400 for displaying a group of communications, e.g., messages, as conversations. Flow 400 begins 402 with operation 404 where a selection of a conversation mode is received. In embodiments, the selection is received by a client computing device such as client 102 (FIG. 1) that receives input from a user. The selection may occur via a user interface such as user interface 108 or by pressing a button on client 102 that is associated with the conversation mode.

After operation 404, flow passes to operation 406 where messages are accessed. The messages may be of any type such as e-mail, text, or voice mail messages. Operation 406 involves, in some embodiments, accessing messages from storage that is local to client device 102, e.g., stored on a local hard drive in device 102. In addition to, or in lieu of, accessing messages locally, operation 406 includes, in some embodiments, retrieving messages from a remote message account stored on a server such as a message server 104 (FIGS. 1-3). As shown in FIG. 4, operation 406 may include sub-steps such as requesting 408 messages from a server and receiving 410 messages from the server.

In embodiments, there will be some messages stored locally but not all of the messages associated with a conversation will be stored locally. Some mobile clients have limited storage capacity and consequently, they store a limited number of messages locally, such as messages received within a predetermined period of time, e.g., the last few days or weeks. Accordingly, there are a number of messages that are sent or received outside the predetermined period of time, so the message information must be retrieved from a remote storage location such as a message account on a server. Accordingly, in embodiments operation 406 will involve both accessing messages locally and sub-steps 408 and 410 for retrieving messages from a remote message server.

In other embodiments, as many communications as possible are stored locally. These embodiments allow messages to be accessed more quickly and are less susceptible to problems associated with establishing connections to the remote storage location. As one example, a mobile client may retrieve information stored remotely on a server. The mobile client may rely on mobile networks for connecting to the server. Mobile networks can suffer from high latencies and unreliable connections (e.g., because of gaps in coverage). It is useful, therefore, for the mobile client to limit its need to connect to the server by having as many messages stored locally as possible.

As part of the process of keeping messages stored locally, in embodiments, a client will periodically synchronize its locally stored messages with the remote server. In one embodiment, a client will send a request to the server to synchronize information. The request includes a filter to limit the items to be synchronized. The filter may limit the synchronization to certain messages, such as message that relate to a particular conversation or received within a predetermined period of time.

Some users may have large amounts of messages that relate to hundreds or even thousands of conversations. It is, thus, in some cases impractical to organize all of a users messages into conversations. Accordingly, in one embodiment only messages sent or received within a predetermined period of time, e.g., the last few days, weeks or months are accessed in operation 406.

It should be noted that accessing messages 406 involves, in some embodiments, accessing all of the information of a message such as content and metadata. In other embodiments however, accessing messages 406 may involve accessing only a portion of the information of a message. As one example, in embodiments in which conversations are displayed using user interfaces such as user interfaces 108 and 130 (FIGS. 1 and 2), it is only necessary to access or retrieve enough information to present the graphical elements illustrated in interfaces 108 and 130, such as the subject information, recipient and sender information, date/time information, status information, attachment information, and read/unread information. As such, in embodiments, only the necessary information is retrieved or accessed during operation 406.

The messages accessed in operation 406, may be stored across a number of different storage structures. In other words, not only may the messages be stored both locally and remotely they may be stored in one or more folders, directories, subdirectories, etc. In one embodiment, the messages are stored in more than one folder, and operation 406 includes accessing each of the folders that store the messages.

After operation 406, flow passes to operation 412 where conversations are identified. Any suitable way for identifying groups of messages as conversations may be utilized in operation 412. In one embodiment, the conversations are identified using conversation identifiers associated with the messages accessed in operation 406. As explained in greater detail below, some embodiments include adding conversation identifiers to messages so that messages that relate to the same conversation i.e., are traced back to the same original message, are tracked by being associated with the same conversation identifier. In other embodiments, the conversations may be identified by similar subject matter. For example, key word searches within content, e.g., subject headers or recipient/sender headers can be used to identify messages having similar subject matter. Messages with similar subjects, recipients, and/or senders are then identified as belonging to the same conversation. Other embodiments may utilize a combination of methods, such as identifiers and similar subject matter.

As noted above, in some embodiments only messages sent or received within a predetermined period of time, e.g., the last few days, weeks, or months are accessed in operation 406. In this embodiment, during operation 412, only those conversations that have been active (have related messages sent or received during the predetermined period of time) will be identified in operation 412. As will be appreciated by those with skill in the art, those conversations that are active during the predetermined period of time may include messages that were sent or received outside of the period of time. Because client 102 may have only a limited amount of storage space it may store only some of the messages of a conversation, e.g., messages sent or received within the predetermined period of time.

If client 102 does not store all of the messages of a conversation, then the messages must be retrieved from a remote location, e.g., an e-mail message account on server 104. Accordingly in these embodiments operation 412 will be followed by operation 414 where additional messages are accessed. Operation 414 may include sub-step 416 for requesting additional messages from a remote server and sub-step 418 for receiving the additional messages from the server. Sub-step 416 includes in embodiments sending a conversation identifier (ID) with the request so that all of the messages associated with the conversation identifier can be identified. In these embodiments, sub-step 418 will include receiving all of the messages associated with the conversation identifier sent in the request. It should be noted that in some embodiments only the necessary message information is retrieved or accessed during operation 414 and not necessarily all of the information of a message.

Flow then passes to operation 420 where a graphical element associated with a conversation is displayed. If all of the messages of a conversation identified at operation 412 are stored locally, flow passes directly from operation 412 to operation 420. In one embodiment, the displayed conversation element may include different icons and text such as illustrated by graphical elements 110-118 (FIG. 1). The graphical element may convey information such as whether there are any (and how many) unopened messages in a conversation, status of messages in a conversation, whether messages include attachments, sender/recipient information, and date/time information. In embodiments, operation 420 involves determining this information from the messages of a conversation before displaying the graphical element that conveys the information to a user.

In embodiments, after a graphical element is displayed at operation 420, a user may select the graphical element to view the messages associated with the conversation. In these embodiments, flow passes to operation 422 where the selection of the graphical element displayed at operation 420 is received. Following operation 422, graphical elements associated with each message of a conversation are displayed at operation 424. As described above with respect to elements 132-134 (FIG. 2), the message elements may include text and icons that convey information to a user about each associated message. In embodiments, operation 424 includes displaying the graphical elements in a hierarchy that conveys information about the relationship among the messages in a conversation. Operation 424 involves, in embodiments, determining this information from the messages of a conversation before displaying the graphical elements that convey the information to a user. Operational flow 400 ends at 426.

Figure 5:
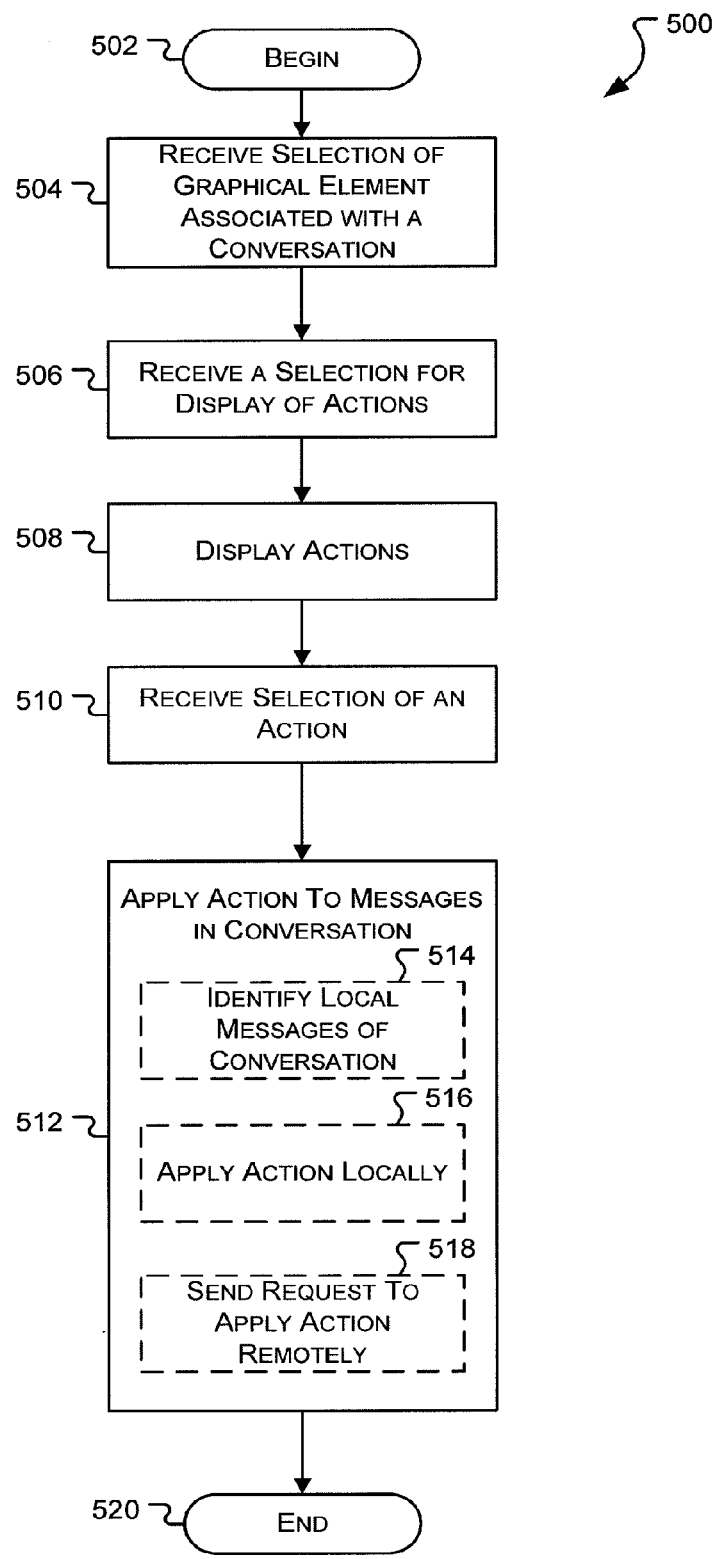
FIG. 5 illustrates an operational flow for performing actions on conversations consistent with an embodiment.

FIG. 5 illustrates an operational flow 500 for applying actions to groups of messages as conversations. Flow 500 begins 502 with operation 504, where a selection of a graphical element associated with a conversation is received. In embodiments, operation 504 is performed by a client device such as client 102 (FIG. 1). In one embodiment, client 102 displays an interface such as interface 108 (FIG. 1), which displays a list of conversation elements associated with a number of conversations. At operation 504, a selection of one the graphical elements is received.

After operation 504, flow passes to operation 506 where a selection for display of actions is received. Operation 506 occurs, in embodiments, in response to a user selecting a displayed button or pressing a button on client 102. In embodiments, operation 506 includes displaying a menu with a list of actions that may be performed on the previously selected conversation (504 above). The actions may for example include: delete, ignore, reply, reply to all, mark as read, mark as unread, move, clear flag, and follow-up as illustrated in menu 152 (FIG. 3). The actions are not limited to the foregoing and may include other actions. Moreover, operation 508 is not limited to displaying the actions in a menu. In embodiments, the actions are displayed in a pop-up box/balloon, in a dialog box, in a separate window, or as a drop down menu from a tool bar.

After operation 508, flow passes to operation 510 where a selection of an action is received. Operation 510 occurs in embodiments as a response to a user selecting an action from the list of actions displayed at operation 508. After receiving the selection flow proceeds to operation 512 where the selected action is applied to messages in the conversation selected at operation 504.

Operation 512 in embodiments includes a number of sub-steps shown as 514, 516, and 518 in FIG. 5. As those of skill in the art will appreciate, messages associated with the conversation selected at operation 504 may be stored in different locations. For example, some of the messages may be stored locally on client 102, while other messages may be stored remotely in a message account on a remote server. In one embodiment, client 102 only stores messages that have been sent or received within a predetermined period of time. Thus, if the conversation selected at operation 504 includes messages that have been sent or received outside of the predetermined period of time, those messages will not be stored locally on client 102. Operation 512 will in these embodiments include sub-steps for performing the selected action on messages stored remotely. Accordingly, for those messages stored locally operation 512 will include sub-step 514 where local messages that are associated with the conversation selected at operation 504 are identified. After sub-step 514, sub-step 516 is performed to apply the selected action to those messages stored locally. For example, if the action is a delete action, then all of the messages stored locally and identified at sub-step 514 will be deleted.

In those embodiments where the selected conversation includes messages that are not stored locally, operation 512 will include sub-step 518 where a request to apply the action to those messages stored remotely is sent. The request sent at sub-step 518 includes, in embodiments, a conversation ID. The conversation ID is used by a remote server to identify those messages on which the action is to be applied. The server then applies the action to those messages associated with the conversation. Operational flow 500 then ends at 520.

Figure 6:
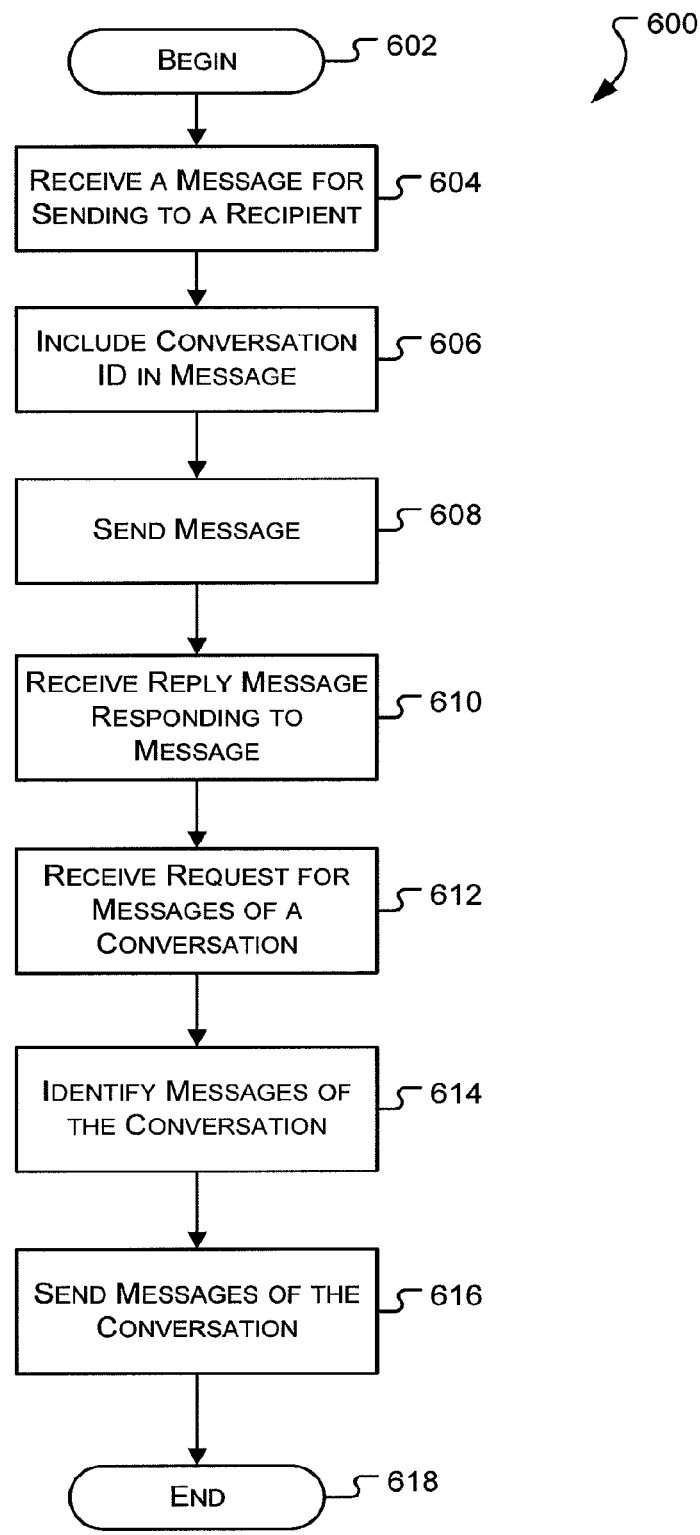
FIG. 6 illustrates an operational flow for identifying messages related to a conversation consistent with an embodiment.

FIG. 6 illustrates an operational flow 600 for identifying and tracking messages by conversations. Flow 600 in embodiments is implemented by a message server such as server 104 (FIG. 1). The message server may be part of a system that includes a mobile client and a message account, e.g., e-mail account, stored on server 104. In these embodiments, any messages sent from the mobile device will be first transmitted to the message account on the message server. The message server will then transmit the message over a network to the intended recipient. Also, any messages sent to the mobile client are transmitted through server 104 before being forwarded to the mobile client.

Flow 600 begins 602 with operation 604 which receives a message for sending to a recipient. The message received at operation 604 may be sent by, for example, by a mobile client. After operation 604, flow passes to operation 606 where a conversation ID is included in the message received at operation 604. Operation 606 includes in embodiments a number of sub-steps. For example, in one embodiment a determination is made, as part of operation 606, whether a message has been previously associated with a conversation ID. If so, the previously used conversation ID will be included in the message. If a determination is made that the message has not previously been associated with a conversation ID then the message is an original send message and a new conversation ID is included in the message. The inclusion of the conversation ID facilitates identification of groups of messages which can be traced to the same original message. Once a new conversation ID is associated with an original message, any reply or send message related to the original message will contain the same conversation ID.

In embodiments, the conversation ID should be relatively unique, such that no two conversations have the same conversation ID. In some embodiments, conversation ID's may be numerical values. For example, a new conversation ID can be generated by incrementing a previously used conversation ID. In some embodiments, the conversation ID is a Universally Unique Identifier UUID or a Globally Unique Identifier GUID. In other embodiments, the conversation ID is any unique string of characters.

After operation 606, flow passes to operation 608 where the message is sent to the intended recipient. Operation 608 includes in embodiments sending the message through communication networks, such as telecommunications networks and/or computer networks (e.g. LANs and WANs). Also, as part of operation 608 the server may store a copy of the message. Following operation 608, operation 610 receives a reply message. The reply message is received through communication networks. The reply message is a message sent by the recipient of the original message sent at operation 608. In embodiments, the server 104 stores the message locally and forwards the message to the mobile client for viewing by a user.

Flow then passes to operation 612 which receives a request for messages associated with a conversation. In embodiments, the request received at operation 612 is sent by a mobile client that is retrieving messages for displaying as conversations. The request will include in embodiments a conversation ID; for example the conversation ID included in the original message sent at operation 608 and the reply message received at operation 610. In other embodiments, the request includes key words that relate to subject matter of a conversation.

In some embodiments, the request will be associated with a synchronization of messages between the mobile client and the server. In embodiments, the mobile client and the server will periodically synchronize information. For example, the mobile client may synchronize different communications, e.g., e-mail messages, text messages, voice mail message; contact information, e.g., phone numbers, addresses; calendar information, e.g., tasks, appointments etc. The request for synchronization includes, in embodiments, a filter to limit the items to be synchronized. The filter may limit the synchronization to certain messages, such as message that relate to a particular conversation.

After receipt of the request at operation 612, flow proceeds to operation 614 which identifies messages stored on the server that are associated with the conversation identified in the request, e.g., that have the same conversation ID included in the request or similar subject matter. Operation 616 then sends the messages associated with the conversation identified at operation 614. Operational flow 600 then ends at 618.

Figure 7:
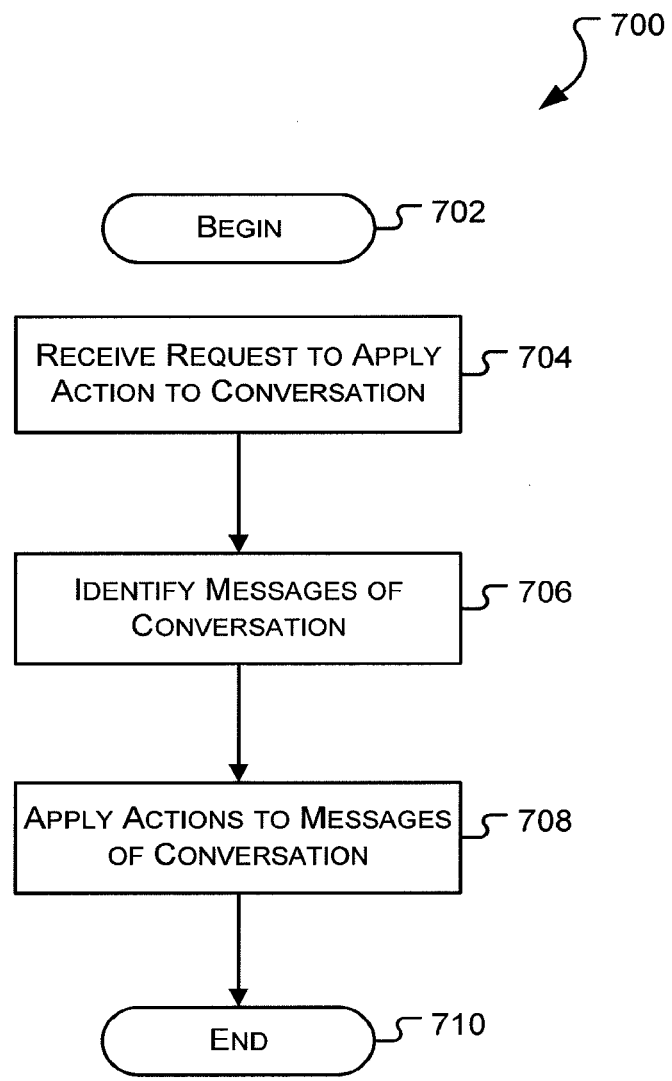
FIG. 7 illustrates an operational flow for performing actions on messages consistent with another embodiment.

FIG. 7 illustrates an operational flow 700 for applying actions to messages of a conversation. Flow 700 in embodiments is implemented by a message server such as server 104 (FIG. 1). Flow 700 begins 702 at operation 704 which receives a request to apply an action to a conversation. In embodiments the request is sent by a client such as client 102 (FIG. 1). The request in embodiments is a result of a user selecting to apply an action to a conversation. Accordingly, the action may have been applied to messages of a conversation that are stored locally on client 102. As part of the process of applying the action to the conversation, client 102 may send the request received at operation 704 to the server 104. The request includes information that identifies the conversation.

Flow passes from operation 704 to operation 706 where messages related to the conversation are identified. As noted above, the request received at operation 704 includes information that allows server 104 to identify messages associated with the conversation. Operation 706 may include using a conversation ID to search and identify messages associated with the conversation. In other embodiments, operation 706 includes identifying similar subject matter using key words or other search technology to identify messages that are related to a conversation. Operation 706 is followed by operation 708 which applies actions to those messages identified in operation 706. For example, if the action is to delete the messages associated with the conversation, operation 708 will delete all of those messages identified as associated with the conversation. Flow then ends at 710.

Figure 8:
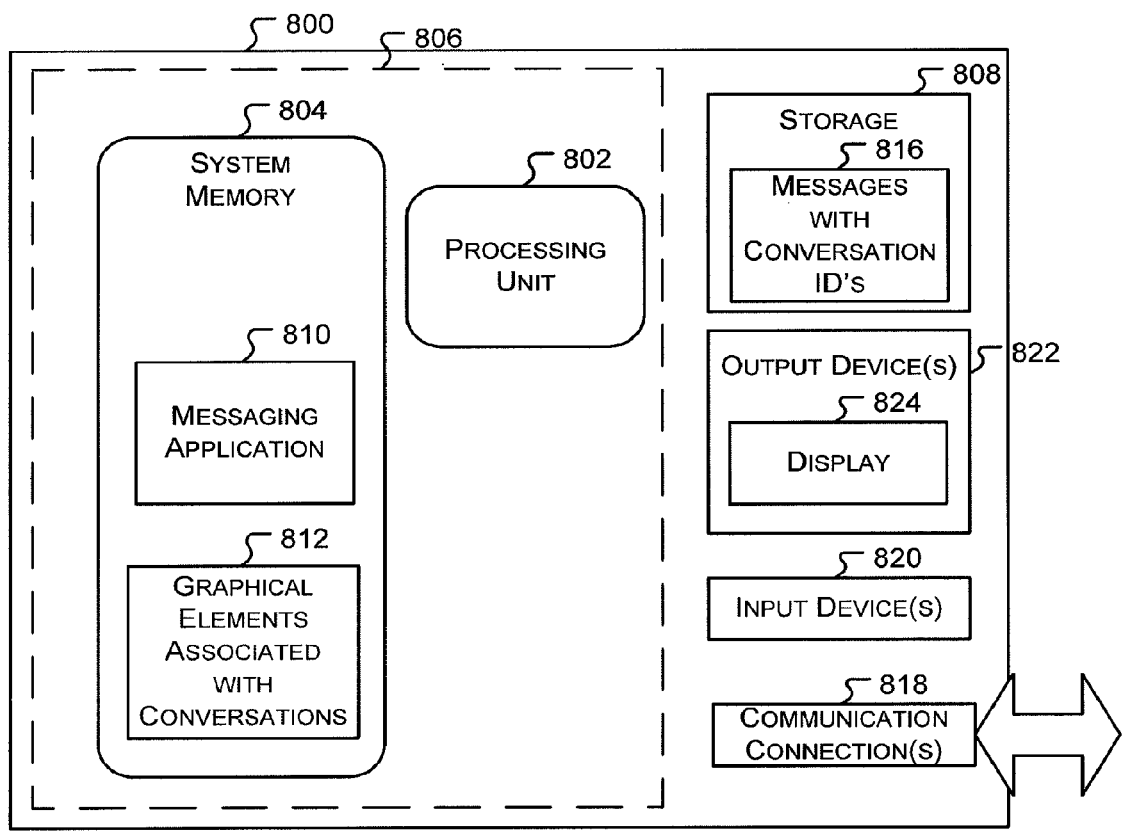
FIG. 8 illustrates a computing environment for implementing embodiments.

FIG. 8 illustrates a general computer system 800, which can be used to implement the embodiments described herein. The computer system 800 is only one example of a computing environment and is not intended to suggest any limitation as to the scope of use or functionality of the computer and network architectures. Neither should the computer system 800 be interpreted as having any dependency or requirement relating to any one or combination of components illustrated in the example computer system 800. In embodiments, system 800 may be used as a client 102 or server 104 described above with respect to FIGS. 1-3

In its most basic configuration, system 800 typically includes at least one processing unit in 802 and memory 804. Depending on the exact configuration and type of computing device, memory 804 may be volatile (such as RAM), non-volatile (such as ROM, flash memory, etc.) or some combination of the two. This most basic configuration is illustrated in FIG. 8 by dashed line 806. System memory 804 stores applications that are executing on system 800 such as messaging application 810 that allows messages to be displayed in conversations. In addition to applications, memory 804 may also store information being used in operations being performed by system 800, such as graphical elements associated with conversations 812, as described above with respect to FIGS. 1-3.

Additionally, system 800 may also have additional features/functionality. For example, device 800 may also include additional storage 808 (removable and/or non-removable) including, but not limited to, magnetic or optical disks or tape. Such additional storage is illustrated in FIG. 8 by storage 808. Computer storage media includes volatile and nonvolatile, removable and non-removable media implemented in any method or technology for storage of information such as computer readable instructions, data structures, program modules or other data. Memory 804 and storage 808 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 800. Any such computer storage media may be part of system 800.

As those with skill in the art will appreciate, storage 808 may store a variety of information. Among other types of information, storage 808 may store messages 816 that are associated with conversations using conversation ID's.

System 800 may also contain communications connection(s) 818 that allow the system to communicate with other devices. Communications connection(s) 818 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 800 may also have input device(s) 820 such as keyboard, mouse, pen, voice input device, touch input device, track/roller ball, scroll wheel etc. Output device(s) 822 such as a display 824, speakers, printer, etc. may also be included. All these devices are well know in the art and need not be discussed at length here.

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. For example, in embodiments, a client may synchronize its locally stored messages with the remote server. The synchronization request can include a filter to limit the items to be synchronized. The filter may limit the synchronization to messages that relate to a particular conversation. This process may be included as part of the operational flows described above with respect to FIGS. 4-7 or as part of other embodiments not described above. Therefore, various modifications, changes, and variations apparent to those skilled in the art may be made in the arrangement, operation, and details of the methods and systems disclosed herein without departing from the scope of the claimed invention.

We claim:

1. A method for performing actions on a group of e-mail messages, the method comprising:
   receiving a selection indicating a conversation display mode, wherein the conversation display mode organizes the e-mail messages into groups related to conversations;
   receiving a selection of one of the conversations;
   displaying a menu comprising a list of actions that can be applied to the selected conversation, wherein the menu includes an action to ignore the selected conversation;
   receiving a selection of the action to ignore the selected conversation;
   in response to receiving the selection to ignore the selected conversation, performing an ignore action on the conversation, wherein the ignore action comprises removing a plurality of previously displayed e-mail messages associated with the selected conversation from display;
   receiving a selection to change an ignore status;
   displaying a list of ignored conversations;
   receiving a selection of at least one ignored conversation from the list of ignored conversations;
   changing the ignore status of the at least one ignored conversation; and
   displaying the plurality of e-mail messages that were previously removed from display.

2. The method of claim 1, wherein the ignore action further comprises not downloading additional messages related to the conversation.

3. The method of claim 1, further comprising downloading one or more messages associated with the at least one ignored conversation.

4. The method of claim 1, further comprising:
   displaying a graphical element that is associated with the conversation; and
   receiving a selection of the graphical element; and
   in response to receiving the selection of the graphical element, displaying a plurality of graphical elements, each graphical element associated with one of a plurality of related e-mail messages.

5. The method of claim 4, wherein the graphical element associated with the conversation comprises an icon indicating roll-up information.

6. The method of claim 5, wherein the icon indicating roll-up information indicates that at least one message in the conversation has an attachment.

7. The method of claim 4, wherein the plurality of related messages are associated with the conversation and are displayed in a tree hierarchy, the tree hierarchy displaying a communication, and a reply communication indented and below the communication.

8. The method of claim 4, wherein the plurality of related e-mail messages are limited to e-mail messages sent from, or received at, the e-mail account within a predetermined period of time.

9. The method of claim 1, wherein the conversation is displayed upon receipt of an additional message associated with the conversation.

10. A system comprising:
    at least one processor; and
    a computer storage medium encoding computer executable instructions that, when executed by the at least one processor perform a method comprising:
      receiving a message from a client for sending to a recipient;
      including a conversation identifier in the message;
      sending the message to the recipient;
      receiving a reply message that responds to the message, the reply message including the conversation identifier from the message;
      receiving a request for messages related to the conversation, wherein the request includes the conversation identifier;
      identifying the message and the reply message using the conversation identifier;
      in response to the request, sending information from the message and the reply message to the client;
      receiving an indication that the conversation is to be ignored;
      in response to receiving the selection to ignore the selected conversation, performing an ignore action on the conversation, wherein the ignore action comprises removing a plurality of previously displayed e-mail messages associated with the selected conversation from display;
      receiving a new message related to the conversation, wherein upon receiving the indication the new message will not be displayed;
      receiving a selection to change an ignore status;
      displaying a list of ignored conversations;
      receiving a selection of at least one ignored conversation from the list of ignored conversations;
      changing the ignore status of the at least one ignored conversation; and
      displaying the plurality of e-mail messages that were previously removed from display.

11. The system of claim 10, wherein the conversation identifier is a Globally Unique Identifier (GUID).

12. The system of claim 10, wherein the message is an e-mail message.

13. The system of claim 10, wherein the method further comprises, in response to receiving the indication, not sending information from the new message to the client, wherein not sending information from the new message to the client comprises not sending the new message to the client.

14. The system of claim 10, wherein the conversation identifier is a unique string of characters.

15. A storage device encoding computer executable instructions that, when executed by at least one processor, perform a method for performing actions on a group of e-mail messages, the method comprising:
- receiving a selection indicating a conversation display mode, wherein the conversation display mode organizes the e-mail messages into groups related to conversations;
- receiving a selection of one of the conversations;
- displaying a menu comprising a list of actions that can be applied to the selected conversation, wherein the menu includes an action to ignore the selected conversation;
- receiving a selection of the action to ignore the selected conversation;
- in response to receiving the selection to ignore the selected conversation, performing an ignore action on the conversation, wherein the ignore action comprises removing a plurality of previously displayed e-mail messages associated with the selected conversation from display;
- receiving a selection to change an ignore status;
- displaying a list of ignored conversations;
- receiving a selection of at least one ignored conversation from the list of ignored conversations; and
- changing the ignore status of the at least one ignored conversation.

16. The storage device of claim 15, wherein the ignore action further comprises not downloading additional messages related to the conversation.

17. The storage device of claim 15, wherein the method further comprises:
- displaying a graphical element that is associated with the conversation; and
- receiving a selection of the graphical element; and
- in response to receiving the selection of the graphical element, displaying a plurality of graphical elements, each graphical element associated with one of a plurality of related e-mail messages.

18. The storage device of claim 17, wherein the conversation is displayed upon receipt of an additional message associated with the conversation.

* * * * *